US012536055B2

(12) United States Patent
Hayes et al.

(10) Patent No.: US 12,536,055 B2
(45) Date of Patent: Jan. 27, 2026

(54) APPARATUS AND METHOD IN WHICH CONTROL FUNCTIONS AND SYNCHRONIZATION EVENTS ARE PERFORMED

(71) Applicant: Arm Limited, Cambridge (GB)

(72) Inventors: Timothy Hayes, Cambridge (GB); Alejandro Rico Carro, Austin, TX (US)

(73) Assignee: Arm Limited, Cambridge (GB)

( * ) Notice: Subject to any disclaimer, the term of this patent is extended or adjusted under 35 U.S.C. 154(b) by 703 days.

(21) Appl. No.: 17/824,438

(22) Filed: May 25, 2022

(65) Prior Publication Data

US 2023/0385127 A1 Nov. 30, 2023

(51) Int. Cl.
    *G06F 9/52*     (2006.01)
    *G06F 9/30*     (2018.01)
    *G06F 9/38*     (2018.01)

(52) U.S. Cl.
    CPC ............ *G06F 9/52* (2013.01); *G06F 9/30087* (2013.01); *G06F 9/3802* (2013.01); *G06F 9/3818* (2013.01)

(58) Field of Classification Search
None
See application file for complete search history.

(56) References Cited

U.S. PATENT DOCUMENTS

| 9,785,557 | B1 | 10/2017 | Frey et al. |
| 2010/0138611 | A1* | 6/2010 | Rappoport .......... G06F 12/0864 711/E12.001 |
| 2016/0140047 | A1 | 5/2016 | Mukherjee et al. |
| 2021/0103525 | A1 | 4/2021 | Mannava et al. |

OTHER PUBLICATIONS

Wikichip, "Macro-Operation Fusion" May 8, 2020, Retrieved from https://en.wikichip.org/w/index.php?title=macrooperation_fusion &oldid=96786, 11 pages.
Combined Search and Examination Report for GB Application No. 2303353.3 dated Sep. 8, 2023, 7 pages.

* cited by examiner

*Primary Examiner* — Chat C Do
*Assistant Examiner* — William C Wood
(74) *Attorney, Agent, or Firm* — NIXON & VANDERHYE P.C.

(57) ABSTRACT

Apparatus comprises a plurality of processing elements; and control circuitry to communicate with the plurality of processing elements by a data communication path; the control circuitry being configured, in response to a request issued by a given processing element of the plurality of processing elements, to initiate a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution; in which the given processing element is configured to inhibit the issuance of any further requests to the control circuitry until each of the group of processing elements has provided such confirmation.

18 Claims, 10 Drawing Sheets

US 12,536,055 B2

APPARATUS AND METHOD IN WHICH CONTROL FUNCTIONS AND SYNCHRONIZATION EVENTS ARE PERFORMED

BACKGROUND

This disclosure relates to apparatus and methods in which control functions and synchronization events are performed.

Some data processing arrangements involve a control circuitry communicating with a set of other circuitries such as processing elements. It is possible for a processing element to request an operation to be performed in respect of all of the processing elements.

SUMMARY

In an example arrangement there is provided apparatus comprising:
a plurality of processing elements; and
control circuitry to communicate with the plurality of processing elements by a data communication path;
the control circuitry being configured, in response to a request issued by a given processing element of the plurality of processing elements, to initiate a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution,
in which the given processing element is configured to inhibit the issuance of any further requests to the control circuitry until each of the group of processing elements has provided such confirmation.

In another example arrangement there is provided a method comprising:
communicating, by a control circuitry, with a plurality of processing elements by a data communication path;
in response to a request by a given processing element of the plurality of processing elements, initiating a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution; and
the given processing element inhibiting the issue of any further control function requests until each of the group of processing elements has provided such confirmation.

Further respective aspects and features of the disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Overview of Technique

Figure 1:
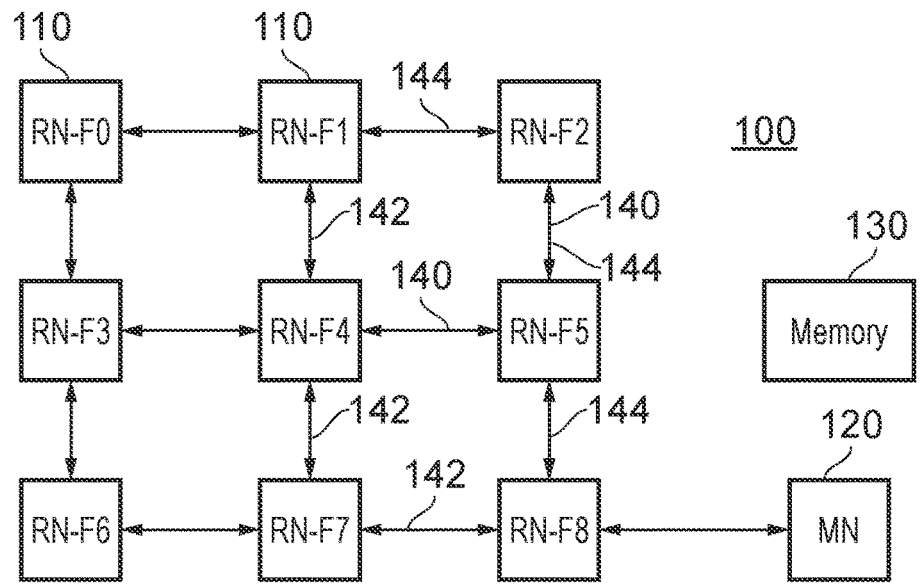
FIG. 1 schematically illustrates an example circuitry.

As further technical background, microarchitecture maintenance instructions found in some types of microprocessor instruction set architecture (ISA), such as the so-called A-class ISA provided or specified by Arm Limited). for example, instructions for translation lookaside buffer (TLB) invalidation (TLBI), must be guaranteed through expensive data synchronization barrier (DSB) instructions. Here, "expensive" can refer to additional latency introduced through the use of such instructions; while the functionality of such instructions is needed to avoid data hazards or other incorrect operation, the additional latency is—of itself—undesirable.

In fact, both of these types of instruction—TLBI and DSB—can impose high latency in operation.

An example will now be described with reference to TLBI instructions followed by DSB instructions. However, it is noted that the techniques could be generalised to other operations of similar form. Examples are given below.

TLB maintenance instructions such as TLBI instructions are part of Arm Limited's so-called A-profile ISAs such as those applicable to the ARMv8-A and ARMv9-A processor specifications. These instructions are provided to ensure that memory management units (MMUs)—both local and remote—are kept coherent whenever there are changes to a page table entry in the operating system or hypervisor.

In an example arrangement, a plurality of interconnected processing elements (PEs) each having a local TLB are provided in a system-on-chip (SoC) or other network-on-chip (NoC) configuration. A control circuitry, sometimes referred to in various examples as a "DVM node" (distributed virtual memory) or "DN", or an "MN" (miscellaneous node) oversees some collective operations relating to functions such as TLB maintenance. There will always be one or more such nodes in this type of configuration. Another node type is a so-called HN-D, which can include the functionality of an MN or DN, albeit while potentially providing other functionality.

In some examples, therefore, the processing elements and the control circuitry are configured as a network of circuitries, and the control circuitry is configured to communicate with the plurality of processing elements using a communication path comprising a set of interconnections between the PEs and the control circuitry.

TLBI instructions to inner and outer shareable domains must co-ordinate with an MN to invalidate TLB entries in remote (other) PEs, referring to an example arrangement in which a set of processing elements are configured to store locally storable information. Here, it is noted that in some examples, cache operations can be implemented using so-called "inner" and "outer" attributes, for multiple levels of cache. The division between inner and outer is specific to an implementation, but in some examples, information categories include "non-shareable" that is completely local to a PE node, then "inner shareable" which is accessible by a grouping of PE nodes and finally "outer shareable" which is accessible by all inner shareable groups plus peripherals. In examples, the present techniques can apply to shareable information.

Some examples discussed in detail below can relate to invalidating TLB information, but the locally storable information (over which an instruction of this type can have an influence such as initiating invalidation) could comprise one or more selected from the list consisting of: (i) address translation information; (ii) branch prediction information and (iii) information held by a cache memory.

For TLBI instructions, the following steps may occur:
A TLBI instruction issues within the processing element (PE). This is an example of a given processing element being configured to initiate performance of a control function (such as a TLBI operation) by the given processing element.
The PE sends a DVMOp (DVM operation instruction) to the MN via the NoC.
The TLBI instruction can complete within the originating PE as soon as it is offloaded to the MN, which is to say the TLBI instruction is non-blocking.
In some examples the PE issuing the TLBI instruction can also invalidate its own (local) TLB entries as part of or in response to the issuing of the TLBI instruction. This can avoid the need for the MN to request that particular PE to perform these actions, so that in such examples, the MN then interacts (for example, successively) with all PEs other than the requesting PE. In other examples, however, the initiating PE does not invalidate its own TLB entries until requested to do so by the MN (which, in such examples, requests all PEs to do this, including the requesting PE).
The MN sequences snoops to and receives responses from all PEs (other than the requesting PE which originated the TLBI instruction in some examples, or all PEs in other examples as discussed above) on the NoC. This provides an example in which the control circuitry is configured to issue a command defining a control function to all of the plurality of processing elements; for example, by issuing a respective command defining a control function to each of the plurality of processing elements successively or in other words sequentially. Responses are sent by those PEs back to the MN as soon as the snoop is received. In this arrangement, each processing element or PE is configured, in response to initiation of a control function such as a TLBI instruction defining an item of locally storable information, to invalidate any copy of that item of locally storable information held at that processing element. However, the remote PE does not need to have completed that operation before sending its response to the MN but it may be required to have initiated it. In other words, in terms of the overview provided above, the stage of execution at a processing element may comprise initiating handling of the control function by circuitry (such as a local processor 200 or translation circuitry 220 to be described below with reference to FIG. 2) controlling storage of locally storable information at that processing element.

When all relevant responses have been received, the MN sends a 'Comp' (completion) packet to the requesting PE.

The requesting PE does not need to wait for the 'Comp' packet before executing more instructions. The remote invalidations, however, are not yet guaranteed to have completed. To ensure that all remote MMUs have invalidated the translation, a data synchronization barrier (DSB) instruction is required.

For DSB instructions, the following steps occur:
A DSB instruction issues within the PE.
The PE must wait for all outstanding "Comp' messages from prior TLBI instructions before the DSB instruction executes.
The PE sends a DVMSync (DVM synchronization operation) to the MN via the NoC.
Unlike TLBI instructions, the DSB instruction does not complete at this point, which is to say that the instruction is blocking.
The MN sequences successive snoops to and receives responses from all PEs on the NoC (or, in other examples, all PEs other than the one which issued the DSB instruction which can initiate the relevant actions itself in a similar manner to the technique discussed above). Unlike TLBI instructions, responses are not sent immediately. Each receiving PE must (a) carry out any pending TLB invalidations, and (b) complete all in-flight memory operations. When this is done, the receiving PE sends a response to the MN.
When all relevant responses have been received (for example, from all PEs or from all but the requesting PE, depending on the arrangement as discussed above), the MN send a 'Comp' packet to the requesting PE.

Since the DVMSync ensures all outstanding loads, stores and TLB invalidations become architecturally visible, there can be a significant latency between each PE's request and response. For this reason, the DSB operation can be a somewhat time-consuming operation that temporarily blocks the PE from doing useful work.

As discussed above, in at least some situations a DSB operation must be performed after one or more TLB maintenance operations such as TLBI operations. In such situations the successive interactions between the MN and the PEs must occur for each of the TLBI operations and the DSB operation.

Embodiments of the present disclosure concern a combined TLBI+DSB operation, realised by selectively employing a fused or hybrid DVMOp+Sync operation which performs the snoop sequencing and response collection just once.

For a combined TLBI+DSB operation, the following steps occur:
Either a TLBI+DSB instruction issues within the PE, if such an instruction is provided by the instruction set of the PE, or another technique is used to provide for the generation of the appropriate message to the MN (examples of such techniques being discussed below with reference to FIGS. 13*a* and 13*b*)
In the case of an architectural TLBI+DSB instruction executing at the PE (in at least those situations as discussed in which the PE performs its own control functions so that the MN initiates such operations at PEs other than the requesting PE), the PE must wait for all outstanding 'Comp' messages from TLBI instructions executed prior to the TLBI+DSB instruction, before the TLBI+DSB instruction executes. In the case that another technique (such as a technique discussed below with reference to FIG. 13a or 13b) is used to combine the effect of execution of separate TLBI and DSB instructions, the PE must wait for all outstanding 'Comp' messages from TLBI instructions executed prior to the TLBI instruction whose effect is being combined with the DSB instruction, before executing the DSB instruction.

The PE sends a DVMOp+Sync to the MN via the NoC.

The MN sequences successive snoops to (as examples of commands to initiate such operations) and receives responses or confirmations from all PEs on the NoC (or, in other examples, all PEs other than the one which issued the DSB instruction which can initiate the relevant actions itself in a similar manner to the technique discussed above). Unlike TLBI operations, responses are not sent immediately. Each receiving PE must (a) carry out any pending TLB invalidations including any defined by the TLBI+DSB operation, and (b) complete all in-flight memory operations. When this is done, the receiving PE sends a response to the MN.

When all relevant responses have been received (for example, from all PEs or from all but the requesting PE, depending on the arrangement as discussed above), the MN sends a 'Comp' packet to the requesting PE.

These operations will be discussed in more detail with reference to at least FIGS. 4 to 12 below.

These techniques may for example be implemented by apparatus to be described below, with reference numerals referring to FIG. 1 to be described in detail below) comprising:

a plurality of processing elements (110)

control circuitry (120) to communicate with the plurality of processing elements (110) by a data communication path;

the control circuitry being configured, in response to a request issued by a given processing element (which may be referred to for example in the terminology of the so-called Advanced Microcontroller Bus Architecture (AMBA) system as a request node or RN) such as RN-F2, of the plurality of processing elements, to initiate a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution, in which the given processing element is configured to inhibit the issuance of any further requests to the control circuitry until each of the group of processing elements has provided such confirmation.

These techniques can alleviate the potential drawback mentioned above (by which the latency and overhead of handshaking, snoop sequencing and response collection and completion is performed twice, once for a TLBI instruction and once for a DSB instruction); in the present examples this can be performed just once.

A perceived benefit of implementing TLBI and DSB operations separately is that a PE can issue multiple TLBI instructions in batches followed by a single DSB instruction, and therefore pay the latency "cost" of the DSB instruction only once for the batch. In other words, the cost of the DVMSync is spread or amortised over several TLBI instructions, thus reducing the average latency of each invalidation. However, in at least some of the present examples, the use of the combined or hybrid operation is not compulsory. In other words, this arrangement can maintain the benefit identified above in which the cost of multiple TLBI operations can be amortised with a single DSB operation, this can still happen in that the batch of TLBI instructions can be issued, but with the last or ultimate TLBI instruction in the batch being fused with the subsequent DSB instruction. This can in fact provide an improved or reduced overall latency compared with the amortisation of the previously proposed batch scheme.

As noted above, the hybrid operation can be performed selectively, so that on some occasions the control circuitry may selectively perform as separate respective operations: in response to a control function request issued by the given processing element, issuing a command to initiate performance of the control function at each of the processing elements; and in response to a synchronization request issued by the given processing element, issuing a command to initiate the synchronization event.

As mentioned above, two example scenarios are considered within the context of the present disclosure. One is that the given (requesting) processing element is configured to initiate performance of the hybrid operation by the given processing element, so that in the situation of a plurality of processing elements, the control circuitry is configured to issue a command defining the hybrid operation to all of the plurality of processing elements other than the given processing element, for example as the subset of processing elements referred to above. In other example arrangements, even the given (requesting) processing element is handled by the control circuitry so that in the situation of a plurality of processing elements, the control circuitry is configured to issue a command defining the hybrid operation to all of the plurality of processing elements. In this case the given processing element is configured to inhibit the issuance of any further requests to the control circuitry until each of the plurality of processing elements has provided confirmation that any control functions pending at that processing element have reached at least the predetermined stage of execution. In either case, the control circuitry may be configured to issue a respective command defining the hybrid operation to each of the processing elements to which it issues such a command (that is, all, or all but the given processing element in either of the above respective scenarios) successively.

In terms of an example software context, in the Linux kernel, system functions for TLB invalidation are found in arch/arm64/include/asmltlbflush.h. These functions can be categorised in two ways:

One off, for example flush_tlb_page in which the TLBI and DSB operations can be combined into a single operation.

Loops, for example flush_tb_range in which the final TLBI operation in the loop can be combined with the subsequent DSB operation into a single operation.

Example embodiments can be implemented architecturally or microarchitecturally, and further details of examples will be given below.

In an architectural implementation, as of ArmV8.7 there are 78 possible variations of TLBI operation. Examples include: VMLE1, ALLE11S, ALLE30S. In some examples a further portion such as 1 bit of the encoding can be used to augment all of these TLBI operation variations with a parameter or "decoration" of "+DSB", producing hybrid instructions such as VMLE1+DSB, ALLE11S+DSB, ALLE30S+DSB and so on. There are numerous places in the 32-bit encoding space where this could be taken from. Here, in these examples, the given processing element is configured to request an operation by the control circuitry by issuing a message to the control circuitry in response to execution of an instruction by the given processing element selected from an instruction set comprising at least one or more instructions to request initiation of respective control functions without initiating a synchronization event, one or more instructions to request initiation of a synchronization event; and one or more instructions to request initiation of hybrid operations.

In a microarchitectural implementation, instead of explicitly defined instructions, an alternative realisation of this invention could make use of macro-operation fusion. Note that in the Linux kernel (as an example), all TLBI instructions are followed by a DSB instruction. When there is a single invalidation, these operations generally occur adjacent to one another. For multiple invalidations, such as a flush_tlb_range, the TLBI operation is contained within a loop and the DSB operation occurs immediately after the loop. Depending on the compiler, there may be a compare instruction and a conditional branch instruction placed between the TLBI and DSB operations. But in all cases, the last TLBI and the DSB instructions will occur within a few instructions of one another. Example embodiments can ensure these are placed on the same instruction cache line. A decoder in a processor's pipeline that already performs macro-op fusion for compare and branch operations could therefore fuse pairs of TLBI and DSB instructions as well.

In such a microarchitectural example, which the given processing element is configured to request an operation by the control circuitry by issuing a message to the control circuitry. In such arrangements the processing element may be configured to selectively merge an operation to request initiation of respective control function without initiating a synchronization event and an operation to request initiation of a synchronization event to form a message initiating a hybrid operation.

Example Circuitry

Referring to FIG. 1, an example NoC apparatus 100 is illustrated comprising an interconnected array (in some examples, a "coherent mesh network" or CMN) of a plurality of processing elements 110 (shown in FIG. 1 as "RN" plus a counter from F0 to F8), a control circuitry or MN 120 and memory circuitry 130 accessible by any one or more of the RNs and MN. Schematic data paths 140 are shown between the RNs to illustrate an interconnected system, forming an example in which the plurality of processing elements and the control circuitry are configured as a network of circuitries, and the data communication path comprises a set of interconnections between the plurality of processing elements and the control circuitry. In an actual embodiment, communication between the MN and a particular RN (taking RN-F1 as an example) could be by any available route through the interconnections. So, for example, a packet to be transmitted from the MN to RN-F1 could pass via a route 142 or via a route 144, according to network congestion and data path availability. The actual routing of information between RNs and the MN (in either direction) may be handled by the NoC in whatever manner is suitable, and does not itself form part of the present disclosure. It is enough to say that the MN can specify a destination such as a particular RN and the NoC will provide routing so as to deliver that data or packet to the specified destination. Similarly, an RN can communicate with the MN (or indeed with another RN) by specifying the required destination and the NoC will route the data or packet accordingly.

Note that of course other configurations and/or numbers of RNs and/or MNs can be used. The example of FIG. 1 is simply for the purposes of clarity of the present explanation.

Figure 2:
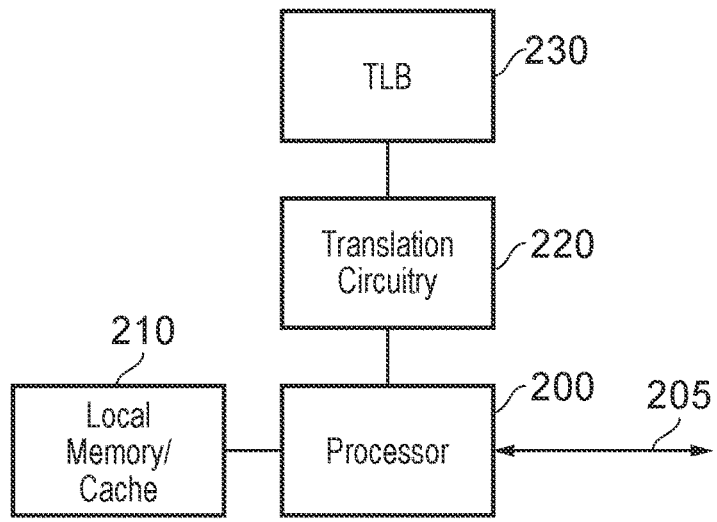
FIG. 2 schematically illustrates a processing element.

FIG. 2 provides an example of circuitry applicable to at least some of the RNs. Not all of the nodes have to have all of the features shown in FIG. 2, and it is also noted that other circuit features may be provided. A processor 200 (having a schematic interface 205 to the NoC arrangement) may be implemented as a single processing element or a cluster of processing elements. The processor 200 can access one or both of the memory 130 or a local memory such as a cache memory 210 according to virtual addresses which, when required, are translated into physical memory addresses by translation circuitry 220 such as a memory management unit (MMU) which in turn accesses a translation lookaside buffer (TLB) 230 when required. Details of memory address translation will not be provided here but features significant the present embodiments are that the TLB 230 stores a local cache of information defining memory address translations. If a change is made to the memory address translation arrangement, for example because of a change in ASID (address space identifier) and/or VMID (virtual machine identifier) initiated by an operating system and/or a hypervisor, it may be the case that some of the information held by the TLB 230 needs to be invalidated.

In the case that the situation initiating the need to invalidate information held by the TLB 230 takes place at one of the processing elements or RNs, that RN may need in turn to request the invalidation of any equivalent entries held by the TLB 230 at other RNs. It can do this by initiating a TLBI operation as discussed above.

The MN includes circuitry and associated memory providing predetermined functionality, including functionality to receive a request from an RN, to perform handshaking, and to initiate interactions with RNs in response to such a request according to the techniques described here.

Figure 3:
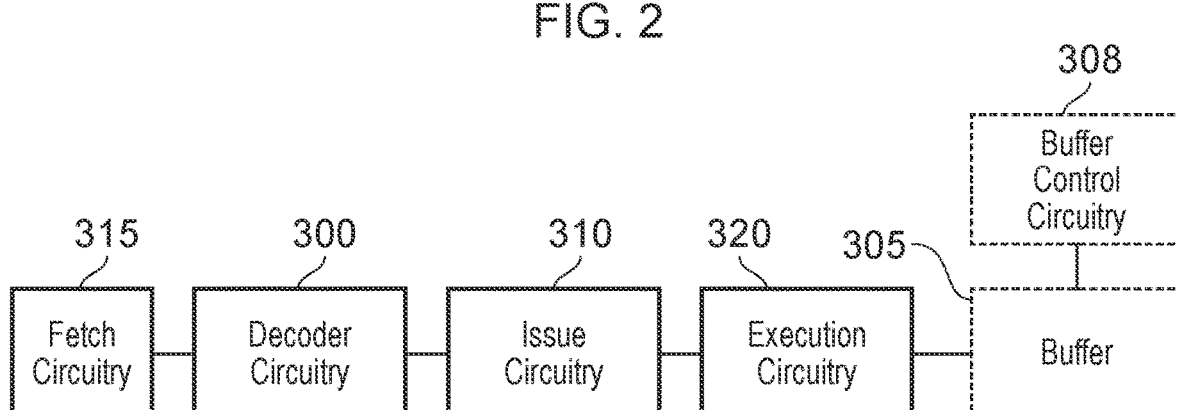
FIG. 3 schematically illustrates a processor.

Further circuitry details are provided in FIG. 3 which schematically illustrates features of the processor 200 which are relevant to a discussion of instruction execution given below. Once again, not all of the processors of the system of FIG. 1 have to have these features, and other features may be present which are not shown in FIG. 3. Having said this, FIG. 3 schematically illustrates the following: instruction fetch circuitry 315 to fetch groups of instructions (which may be referred to as "fetch groups") for decoding in the same decoding cycle such as a clock cycle or other cycle such as a single instance of a decoding operation (otherwise referred to as being "co=decoded" of the decoder circuitry 300); decoder circuitry 300 configured to decode instructions for execution; issue circuitry 310 to issue the decoded instructions: and execution circuitry 320 to execute the issued instructions: optional buffer circuitry 305 and associated buffer control circuitry 308 (for use in an optional microarchitectural technique discussed below).

Handling of a TLBI Operation

Figure 4:
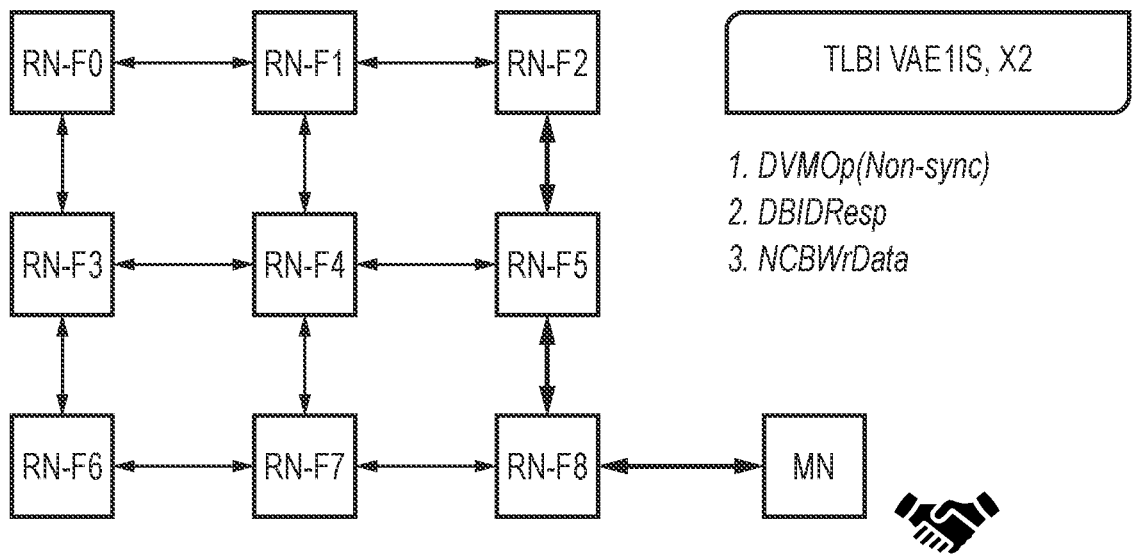
FIGS. 4 to 8 schematically illustrate stages in the handling of a translation lookaside buffer (TLB) invalidation (TLBI) operation.

FIGS. 4 to 8 schematically illustrates stages in the handling of a TLB invalidation operation with reference to the example NoC arrangement of FIG. 1. Consider a processor taking place at an example RN, such as RN-F2:

STR X0, [X1]//update a translation table entry
DSB ISHST//ensure write has completed TLBI VAE1IS, X2//invalidate the TLB entry for the entry that changes
DSB ISH//ensure TLB invalidation is complete
ISB//synchronize context on this processor In terms of the third instruction, TLBI, the RN exchanges information and handshaking with the MN as shown in FIG. 4. The RN sends the DVMOp; the MN responds with a response DBIDResp to confirm that it has space in its memory to accommodate the request and the RN sends data and metadata defining the invalidation as NCBWrData (Here, "NCBWrData" is an abbreviation for "non-copyback write data"). An example routing of communications relevant to this process are shown schematically by bold arrows and a similar notation is used in other diagrams discussed below; however, note that the mesh nature of the example network implies that different routings can be used.

Figure 5:
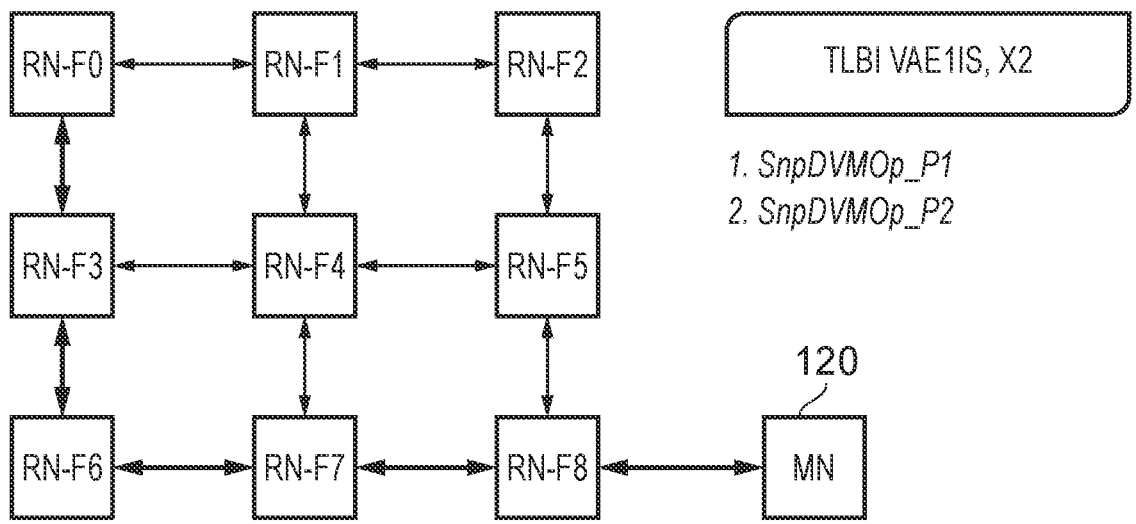
Figure 6:
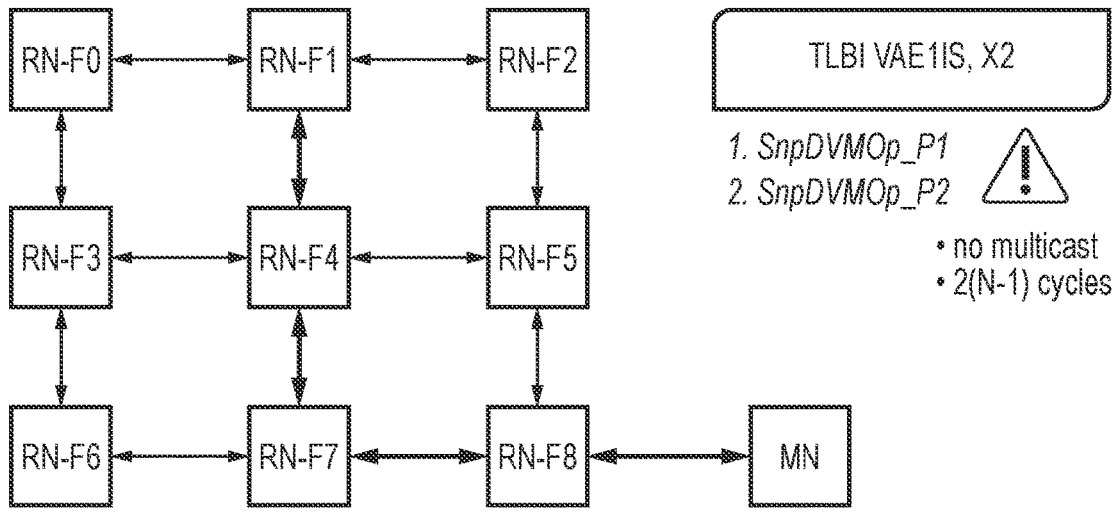

As shown schematically in FIGS. 5 and 6, the MN then performs an interaction with each RN in turn. In FIG. 5, the MN is shown interacting with RN-F0 and in FIG. 6, also illustrating the fact that communication is on an RN-by-RN basis without using multicast, the MN is shown interacting with RN-F1. The MN does not necessarily have to interact with each RN in the schematic order (F0 . . . F8) shown in the diagram; the MN can adopt an order according to its own processes and data communication loading. Each snoop interaction comprises two packets (to provide enough data space to communicate the entire information required for the TLBI interaction) and takes two cycles to sequence or generate at the MN.

Figure 7:
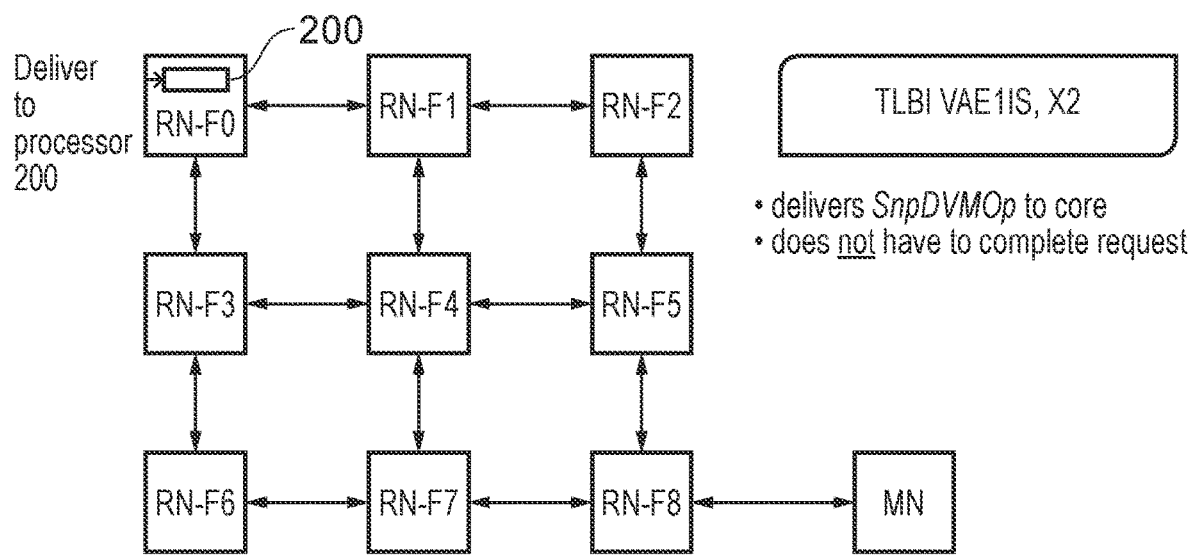

FIG. 7 schematically illustrates that in response to such a snoop interaction, a given RN—such as RN-F0 receiving such a snoop interaction is required to deliver the information SnpDVMOp of the two packets provided by the MN to its respective processor 200 for implementation, but can respond without having completed the TLB invalidation operation. Further detail regarding this step will be discussed with reference to FIG. 9 below.

Figure 8:
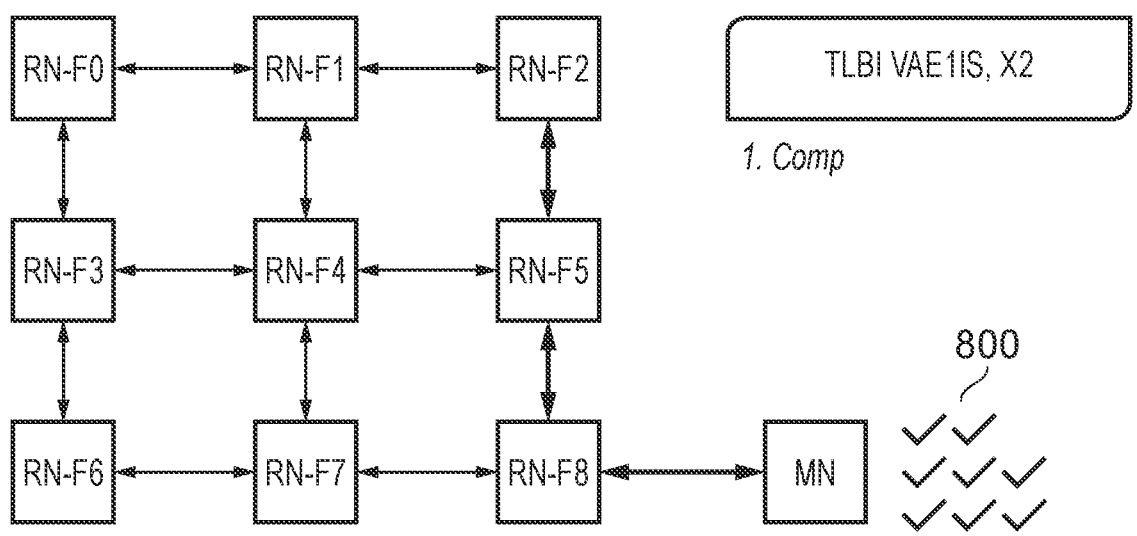

As shown schematically in FIG. 8, the MN receives a response 800 (shown schematically as ticks) from each RN (or—as illustrated—from each RN other than the requesting RN in other examples, the array of ticks being schematically ordered to correspond to the array of RNs as drawn, so that the omission of the tick at the top right of the array of ticks indicates that a response is not received or required in this example from the requesting RN, RN-F2) and once all of these have been received it sends a completion (Comp) message to the requesting RN (RN-F2 in this example).

Figure 9:
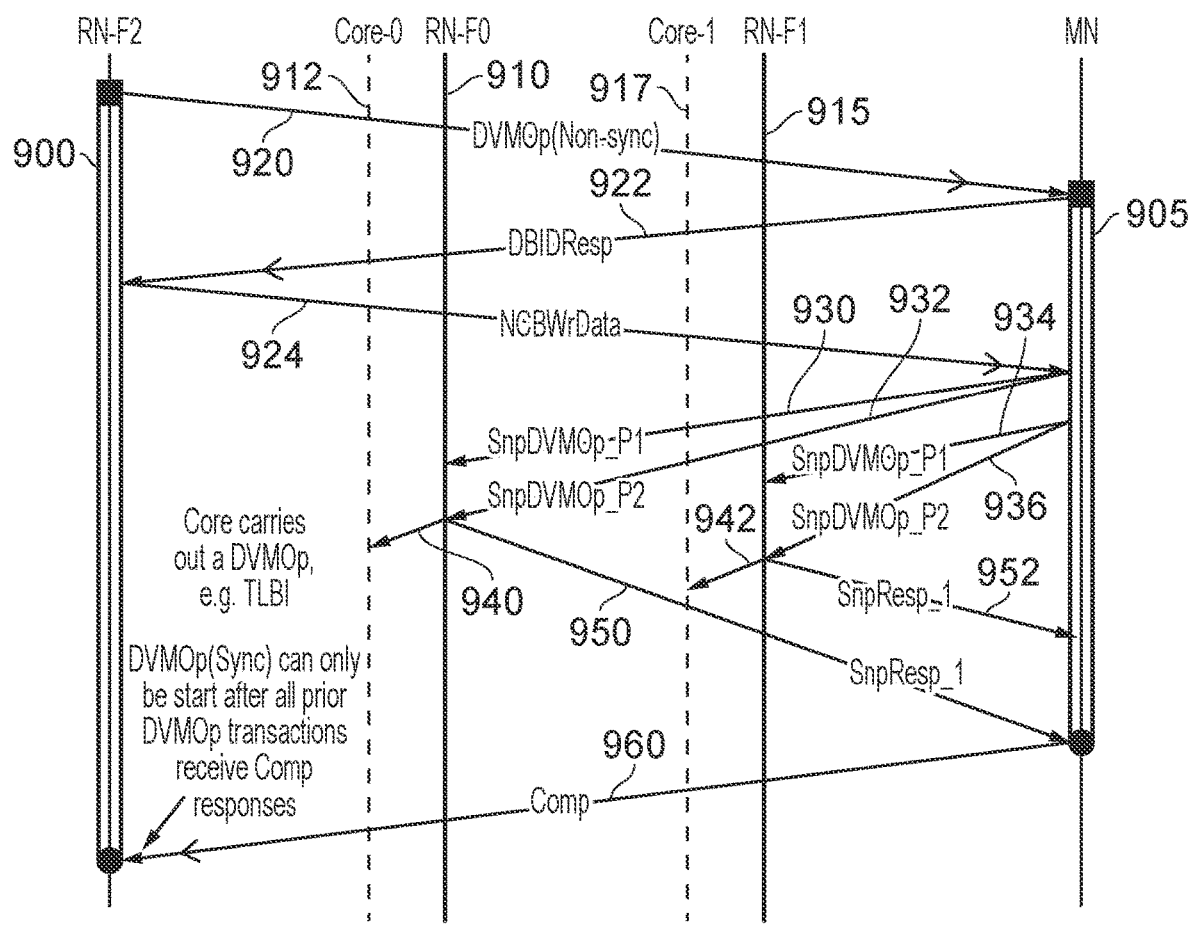
FIG. 9 provides a schematic illustration of stages of a TLBI operation.

FIG. 9 schematically summarizes the operations as described above with reference to FIGS. 4-8 in the context of a control function (referred to here as DVMOp) such as a TLBI. Here, the operation is denoted as DVMOp(Nonsync) to indicate that it is not a synchronizing operation such as a DSB.

Vertical lines in the drawing indicate different example nodes within the circuitry shown in FIGS. 1 and 4-8, with, in this example, a leftmost vertical line 900 representing the requesting RN, namely RN-F2 in this example, a rightmost vertical line 905 representing the MN 120, and intermediate solid vertical lines 910, 915 representing RNs other than the requesting RN. Here, just two of the other RNs (RN-F0 and RN-F1) are shown for clarity of the diagram, but similar steps as those to be described below would be carried out potentially for all RNs other than the requesting RN. Vertical broken lines 912, 917 represent cores or processors 200 of the respective RN, so that the vertical broken line 912 represents the core ("core-0") associated with RN-F0 and the vertical broken line 917 represents the core ("core-1") associated with RN-F1. The steps are ordered in a vertical direction from the top to the bottom as drawn.

Process steps as shown are indicated by schematic arrows linking the different nodes as identified above, with the source or starting point of an arrow indicating the node which initiates a particular communication and the end or destination of that arrow indicating the node to which that communication is provided or otherwise communicated.

With reference to FIG. 9 and referring back to FIG. 4, the first three such arrows 920, 922 and 924 represent communications shown schematically as the communications numbered 1-3 in FIG. 4. In particular, the arrow 920 represents the transmission of the DVMOp(Non-sync) message from the requesting RN (RN-F2) to the MN, to initiate handling of a control function such as TLBI. The MN responds with DBIDResp (arrow 922) and the requesting RN then provides NCBWrData (arrow 924).

With reference to FIG. 9 and referring back to FIGS. 5 and 6, the two snoop operations described with reference to FIG. 5, namely SnpDVMOp_P1 and SnpDVMOpP2, are carried out by the MN. As mentioned above, for clarity of the diagram only two RNs other than the requesting RN are shown, though these operations could be carried out for each RN other than the requesting RN. In each of the two instances shown, the MN performs these snoop operations at arrows 930, 932 in respect of RN-F0 and by arrows 934, 936 in respect of RN-F1. Note that as discussed above with reference to FIG. 6, in the examples described here multicast is not used so that the snoop interactions are implemented sequentially or successively with respect to the RNs to which they are sent.

In each case (and referring to FIG. 7 discussed above), in response to receipt of the second snoop message (SnpDVMOp_P2) each respective RN delivers the information SnpDVMOp of the two packets provided by the MN to its respective processor 200 for implementation (arrow 940 for RN-F0 and arrow 942 for RN-F1). Also, in each case, in response to receipt of the second snoop message (SnpDVMOp_P2) each respective RN provides a respective response (SnpResp_I) to the MN. This is schematically illustrated by arrows 950 (RN-F0) and 952 (RN-F1) and these responses are also represented as the responses 800 in FIG. 8 discussed above (shown schematically in that diagram by the array of ticks discussed above). Note that the sequential or successive nature of the transmission of the snoop messages can result in the responses by the RNs being communicated back to the MN at different respective times.

Finally, in FIG. 9, an arrow 960 represents the transmission of the completion or "Comp" message from the MN to the requesting RN (RN=F2 in this example).

Handling DSB Operations

Referring back to the process at RN-F2 outlined at the start of this section, the RN can initiate a DSB operation. A DSB operation ensures that all previous TLBI operations have been fully carried out. Note that all outstanding Comp messages expected by that RN must have been received before the DSB operation can be performed.

As discussed above, it is possible to batch multiple TLBI instructions together and complete with single DSB instruction. The DSB instruction cannot be issued speculatively—it is executed via the store path of the processor. If a TLBI instruction has been executed since the last DSB instruction, a "DVMSync" operation is generated on the NoC. In a previously proposed technique, this DSB operation (DVMSync) would require a similar RN-by-RN snoop interaction by the MN, but this time in order for an RN to respond to that interaction, it would have to complete the processes required for the DSB operation as discussed above.

Figure 10:
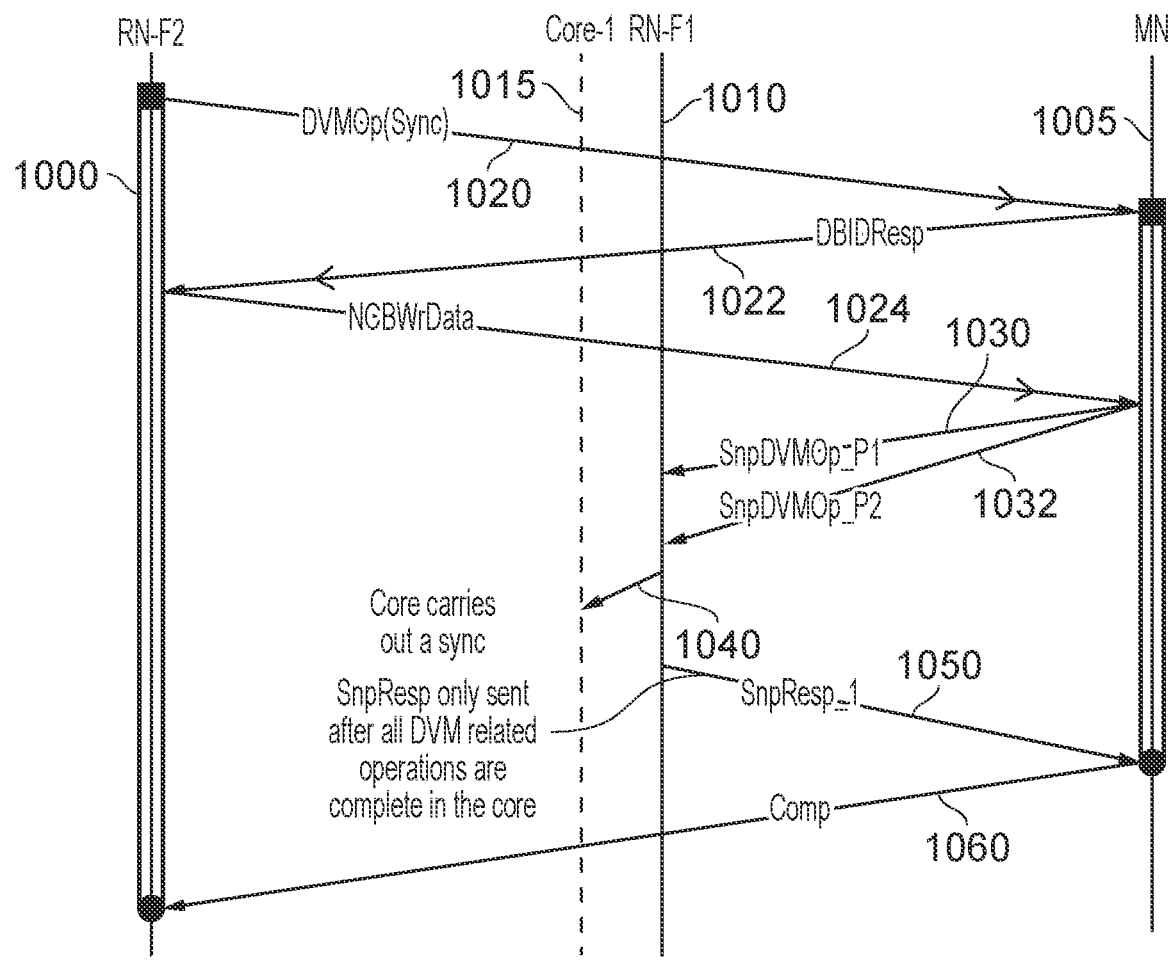
FIG. 10 provides a schematic illustration of stages of a data synchronization barrier (DSB) operation.

FIG. 10 provides more detail with regard to an example DSB operation and uses a similar overall format to that represented by FIG. 9. In FIG. 10, the requesting RN (again, RN-F2 in this example, though of course any arbitrary RN of the example circuitry of FIG. 1 could act as the requesting RN) is represented by a vertical line 1000 and the MN is represented by a vertical line 1005. In the example of FIG. 10, only one other RN of the circuitry of FIG. 1 is schematically represented, for clarity of the diagram, but it will be appreciated that similar operations would be carried out with respect to other RNs apart from the requesting RN. The RN which is represented in FIG. 10 is RN-F1 (vertical line 1010) having an associated core (broken vertical line 1015).

The operation initiated in FIG. 10 is a synchronizing operation such as a DSB but referred to generally as DVMOp(Sync) and the respective message from the requesting RN to the MN is represented by an arrow 1020. The MN responds with DBIDResp (represented by an arrow 1022) and the requesting RN provides NCBWrData relating to the DSB operation by a communication represented by an arrow 1024.

For each non-requesting RN in turn, the MN performs two snoop interactions (SnpDVMOp_P1 and SnpDVMOpP2), with these interactions in the case of RN-F1 being represented by arrows 1030, 1032. In response to receipt of both portions of the snoop interaction, the RN receiving that information (RN-F1 in this example) passes information to its respective processor 200 or core (represented by an arrow 1040) to initiate the performance of a synchronizing operation by the respective core. In contrast to the situation discussed above with respect to the TLBI, the response by that RN to the MN (SnpResp_I, represented by an arrow 1050) is not sent until all relevant DVM related operations are complete at that core.

In a similar manner to that discussed with respect to FIG. 9, the MN obtains responses (SnpResp_I) from each non-requesting RN and, when all of these responses have been received, the MN sends a completion message ("Comp") to the requesting RN, as represented by an arrow 1060 in FIG. 10.

Hybrid Operations

Figure 11:
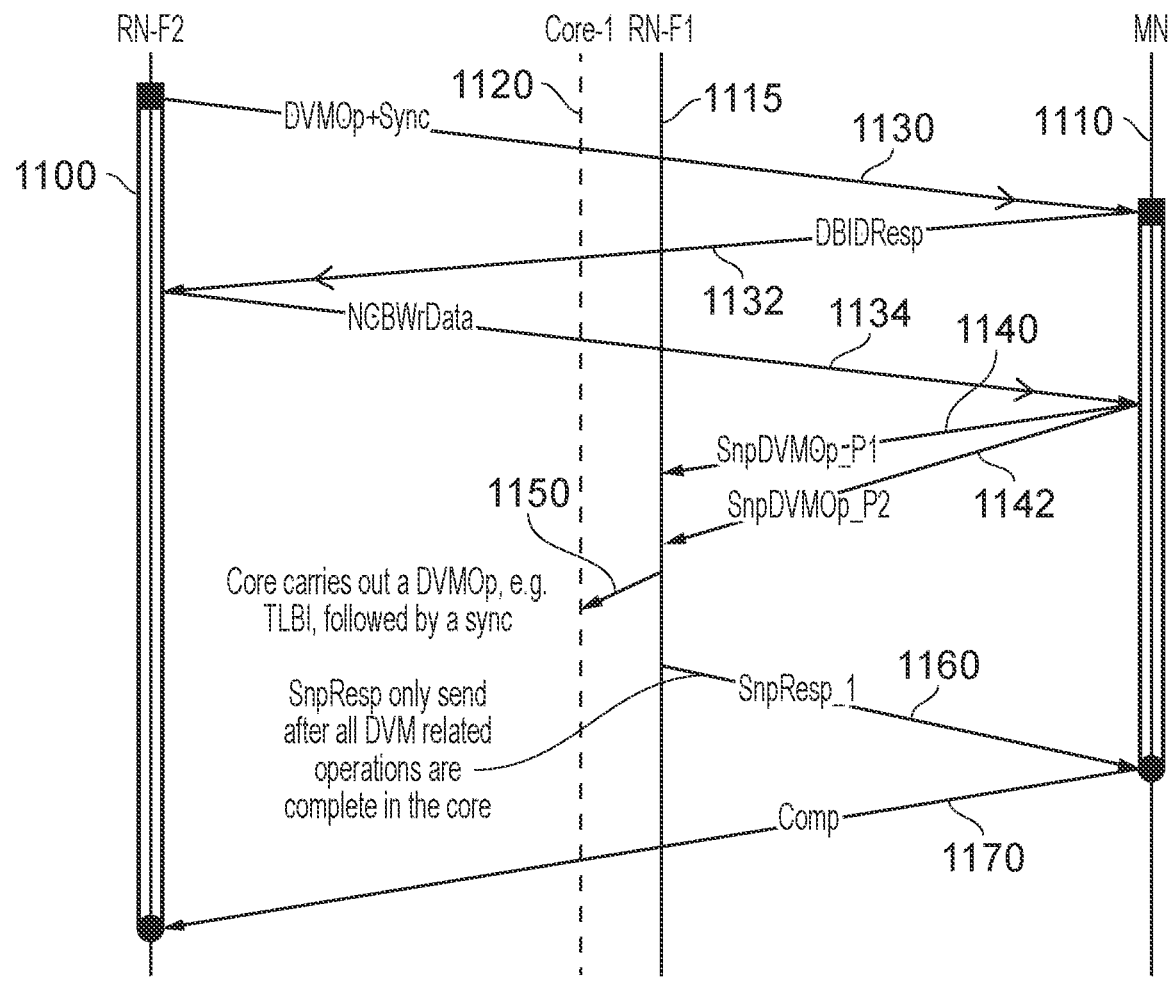
FIG. 11 provides a schematic illustration of stages of a hybrid TLBI and DSB operation.

FIG. 11 provides a representation, using a similar overall format to that used by FIGS. 9 and 10, of a hybrid operation. An example of such a hybrid operation is a TLBI+DSB, but more generically such a hybrid operation may comprise a control function plus a synchronizing function, for example a synchronizing function for which the performance of that synchronizing function in respect of a given RN depends upon the completion of any pending instances of the control function at that RN. In FIG. 11, the hybrid operation is referred to as "DVMOp+Sync".

Once again, the requesting RN, RN-F2 in this example, is represented by a vertical line 1100; the MN is represented by a vertical line 1110 and—for clarity of the diagram—only one other RN (RN-F1) is shown by a vertical line 1115 with its associated core (by a broken vertical line 1120.

The DVMOp+Sync operation is initiated in FIG. 11 is initiated by a message from the requesting RN to the MN which is represented by an arrow 1130. The MN responds with DBIDResp (represented by an arrow 1132) and the requesting RN provides NCBWrData relating (for example) to both the TLBI and the DSB operation, by a communication represented by an arrow 1134.

For each non-requesting RN in turn, the MN performs two snoop interactions (SnpDVMOp_P1 and SnpDVMOp_P2), with these interactions in the case of RN-F1 being represented by arrows 1140, 1142. In response to receipt of both portions of the snoop interaction, the RN receiving that information (RN-F1 in this example) passes information to its respective processor 200 or core (represented by an arrow 1150) to initiate the performance of the control function and the synchronizing operation by the respective core. Because the hybrid operation involves synchronization, as with FIG. 10 the response by that RN to the MN (SnpResp_I, represented by an arrow 1160) is not sent until all relevant DVM related operations are complete at that core.

In a similar manner to that discussed with respect to FIGS. 9 and 10, the MN obtains responses (SnpResp_I) from each non-requesting RN and, when all of these responses have been received, the MN sends a completion message ("Comp") to the requesting RN, as represented by an arrow 1170 in FIG. 11.

Figure 12:
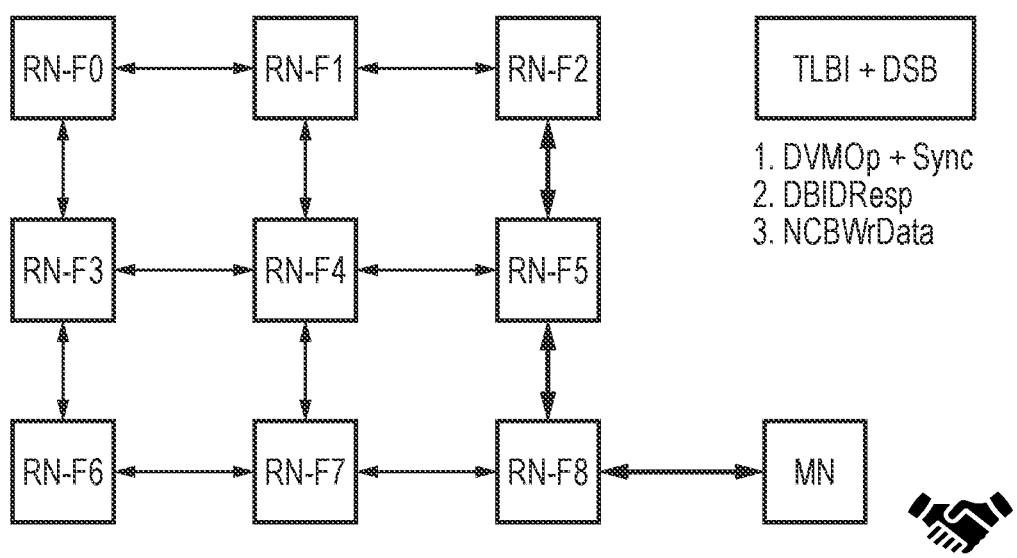
FIG. 12 schematically illustrates the initiation of a hybrid TLBI and DSB operation.

FIG. 12 also provides a schematic representation of the first three interactions shown in FIG. 11, namely the communication of DVMOp+Sync (arrow 1130 in FIG. 11) from an example requesting RN such as RN-F2 to the MN, the MN's response DBIDResp (arrow 1132) and the requesting RN's provision of NCBVWData (arrow 1134) to the MN. Subsequent interactions take place as indicated by FIG. 11.

In example arrangements, the control circuitry selectively initiates a hybrid operation comprising performance of a control function and initiation of a synchronization event.

Various possibilities are available for causing or prompting the control circuitry to do this. A single set of snoop interactions would be performed by the MN, each initiating the functionality required for TLB invalidation and DSB operation.

These new forms of hybrid operation would have similar or equivalent semantics as the TLBI operation but would also trigger the effects of a DSB operation. This can be done in some examples by combining an AMBA/CHI request of a DVMOp (TLBI) with DVMSync (DSB) requests into a new request type such as DVMOp+Sync. It could carry the same metadata as a DVMOp (used for the TLBI operation) which is delivered to each RN-F via snoops, however, the response to the MN would only be sent when the DVMSync has been fully carried out.

Hybrid Operation—Architectural Examples

In an example architectural implementation, the instruction set applicable to the processor 200 of an RN could include separate control function and synchronization instructions along with a hybrid instruction. Execution of the control function instruction would cause the RN to issue a DVMOp(Non-Sync) message to the MN, for example to initiate performance of a TLBI operation. Execution of the synchronization instruction would cause the RN to issue a DVMOp(Sync) message to the MN, for example to initiate performance of a DSB operation. Execution of the hybrid instruction would cause the RN to issue a DVMOp+Sync message to the MN, for example to initiate performance of a TLBI+DSB operation. These instructions would be decoded and executed by the arrangement of FIG. 3.

Hybrid Operation—Microarchitectural Examples

In further example arrangements, the processing element selectively fuses operations so as to generate a hybrid operation comprising performance of a control function and initiation of a synchronization event. These arrangements are particularly (though not exclusively) suited to arrangements in which an architectural hybrid instruction is not provided, which is to say arrangements in which the given processing element is configured to request an operation by the control circuitry by executing an instruction selected from an instruction set comprising one or more instructions to request initiation of respective control functions without initiating a synchronization event and one or more instructions to request initiation of a synchronization event.

One microarchitectural technique to achieve this is "macro-op fusion" (short for macro-operation fusion) which can be performed in the decoder part of the RN pipeline, which is to say at the decoder 300 of FIG. 3. This technique is performed to fuse the decoded TLBI and DSB instructions into a fused operation which eventually generates a DVMOp+Sync message. Macro-op fusion is discussed in the reference https://en.wikichip.org/wiki/macro-operation_fusion for example, the contents of which are hereby incorporated into the present description by reference.

Figure 13A:
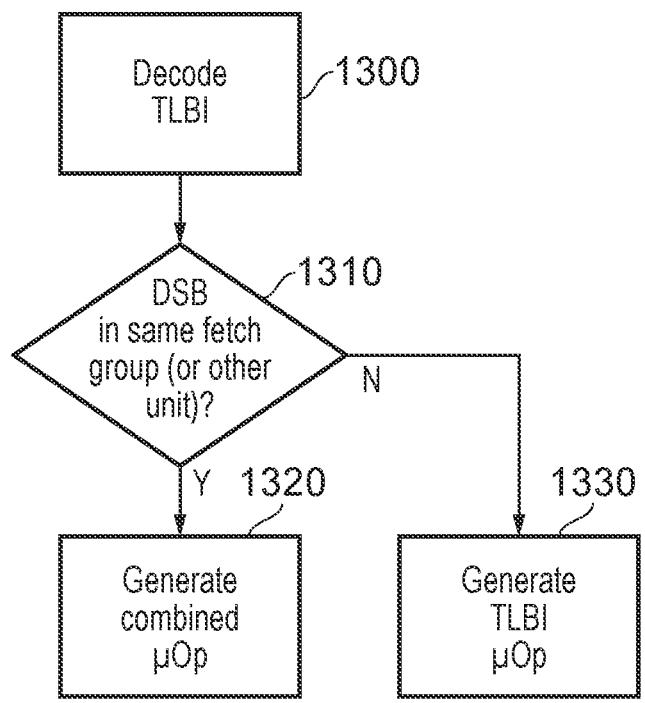
FIGS. 13a, 13b and 14 are schematic flowcharts illustrating respective methods.

FIG. 13a provides a schematic flowchart illustrating a basic arrangement for doing this macro-op fusion technique, in which at a step 1300 the decoder circuitry 300 of the RN decodes a TLBI instruction.

At a step 1310 the decoder 300 of the RN detects whether a DSB instruction is present (and decoded) within the same fetch group, noting the proximity in terms of code execution of a last TLBI instruction and a DSB instruction in typical code as discussed above.

Two outcomes then follow depending on the outcome of the step 1310.

When the outcome of the step 1310 is affirmative ("Y") then control passes to a step 1320 at which the decoder 300 generates a combined or hybrid micro-operation (μOp) to cause (when executed) that RN to issue a message to the MN to initiate a combined or hybrid TLBI+DSB operation the execution leading to the generation of a DVMOp+Sync message.

When the outcome of the step 1310 is negative ("N") then control passes to a step 1330 at which the decoder 300 generates a μOp to cause (when executed) that RN to issue a message to the MN to initiate a TLBI operation, the execution leading to the generation of a DVMOp message.

This provides an example in which the given processing element comprises an instruction decoder 300 configured, in response to the instruction decoder decoding an instruction to request initiation of respective control functions without initiating a synchronization event; and decoding an instruction to request initiation of a synchronization event, to generate one or more micro-operations which, when executed, are configured to control generation of a request for initiating the hybrid operation. For example, the instruction decoder circuitry 300 may be configured to generate the one or more micro-operations which, when executed, are configured to control generation of a request for initiating the hybrid operation when the decoded instruction to request initiation of respective control functions without initiating a synchronization event and the decoded instruction to request initiation of a synchronization event are in a same group of instructions (such as a so-called fetch group for decoding at a common decoding cycle) fetched by the instruction fetch circuitry 315.

Another microarchitectural technique is buffering and coalescing.

In general terms this technique holds back the outcome of a TLBI instruction for up to several cycles in a buffer at the RN. If during these several cycles a DSB instruction is also buffered, then the two can be coalesced or merged so as to generate a combined DVMOp+Sync message to be sent to the MN.

Figure 13B:
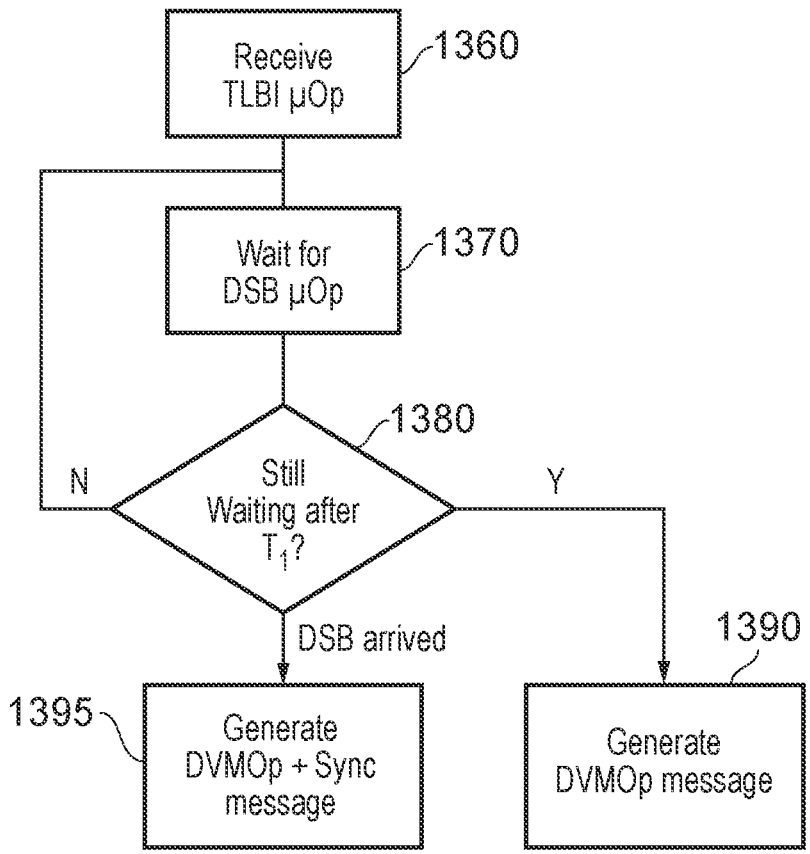

FIG. 13b provides a schematic flowchart illustrating a basic arrangement for doing this buffering and coalescing technique, in which at a step 1360 the optional buffer 305 of the RN of FIG. 3 (which follows the execution circuitry 320 in the pipeline order) receives the result of execution of a TLBI μOp. As discussed above with respect to FIG. 3, the operations described here in respect of the buffer circuitry 305 can be performed, controlled or overseen by the buffer control circuitry 308.

At a step 1370 the RN waits to see whether the result of executing a DSB μOp is then received at the buffer 305. At a step 1380 a detection is made as to whether the buffer 305 is still waiting after a predetermined period $T_1$ such as a predetermined number of cycles (for example, six cycles), noting the proximity in terms of code execution of a last TLBI instruction and a DSB instruction in typical code as discussed above.

Three outcomes then follow depending on whether a DSB μOp is handled in time.

If the step 1380 detects that the buffer 305 is still waiting but the delay is still within the predetermined time $T_1$ or number of cycles, then control passes back to the step 1370.

If the time $T_1$ has passed but the result of execution of a DSB μOp has not been received, control passes to a step 1390 at which a DVMOp message appropriate to the TLBI μOp for which the buffer was populated at the step 1360 is generated for sending to the MN.

If the result of executing a DSB μOp has arrived within $T_1$, the buffer control circuitry 308 coalesces or merges the two operations and at a step 1395 generates a DVMOp+Sync message relevant to that executed TLBI instruction and that executed DSB instruction for sending to the MN.

This provides an example in which the given processing element is configured to merge a result of execution by the given processing element of an instruction to request initiation of respective control functions without initiating a synchronization event and a result of execution by the given processing element of an instruction to request initiation of a synchronization event, to generate a request for initiating the hybrid operation. For example, the given processing element may be configured to generate the request for initiating the hybrid operation when the result of execution by the given processing element of an instruction to request initiation of respective control functions without initiating a synchronization event and a result of execution by the given processing element of an instruction to request initiation of a synchronization event are generated within a threshold number of clock cycles of one another.

As a potential variant, given the sequential nature of the MN's snoop interaction with each RN, it would be possible for a DSB instruction to be received during the execution of a TLBI operation, so that snoop interactions which have not yet taken place could be implemented as combined TLBI+DSB interactions so that the separate DSB functionality would only have to be performed in respect of RNs with which the TLBI snoop interaction had already taken place when the DSB instruction was received. However, this would involve relatively complex tracking functionality which would have to be balanced against the potentially improved latency obtained by this arrangement.

Method Example

Figure 14:
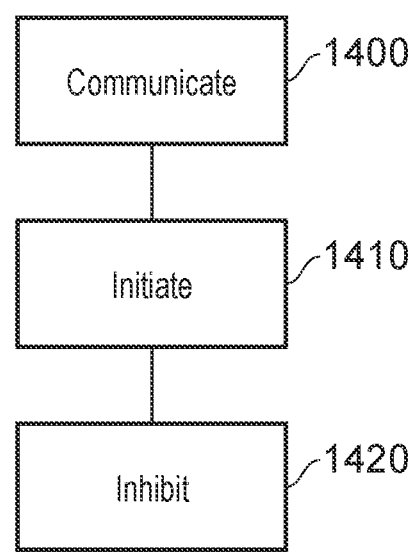

FIG. 14 is a schematic flowchart illustrating a method comprising:

communicating (at a step 1400), by a control circuitry, with a plurality of processing elements by a data communication path;

in response to a request by a given processing element of the plurality of processing elements, initiating (at a step 1410) a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution; and the given processing element inhibiting (at a step 1420) the issue of any further control function requests until each of the group of processing elements has provided such confirmation.

Example Results

In example embodiments or simulations thereof, potential latency improvements of the type discussed above have been assessed, for example by empirically executing example code with and without the selective use of hybrid operations. In an example system, removing one TLBI operation (by using a hybrid TLBI+DSB instead of a DSB where appropriate) can reduce the time that a requesting RN's core is blocked by 70 nanoseconds (nS) in a 1.95 GHz processor forming one of a set of 64 RNs interacting with an MN.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

Clauses

Respective aspects and features of the present disclosure are defined by the following numbered clauses:
1. Apparatus comprising:
    a plurality of processing elements; and
    control circuitry to communicate with the plurality of processing elements by a data communication path;
    the control circuitry being configured, in response to a request issued by a given processing element of the plurality of processing elements, to initiate a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution,
    in which the given processing element is configured to inhibit the issuance of any further requests to the control circuitry until each of the group of processing elements has provided such confirmation.
2. The apparatus of clause 1, in which:
    the control circuitry is further configured to selectively perform as separate respective operations:
    in response to a control function request issued by the given processing element, issuing a command to perform the control function; and
    in response to a synchronization request issued by the given processing element, issuing a command to initiate the synchronization event.
3. The apparatus of clause 1 or clause 2, in which the given processing element is configured to initiate performance of the hybrid operation by the given processing element.
4. The apparatus of any one of clauses 1 to 3, in which:
    each of the processing elements is configured to store locally storable information; and
    each of the processing elements is configured, in response to initiation of a control function defining an item of locally storable information, to invalidate any copy of that item of locally storable information held at that processing element.
5. The apparatus of clause 4, in which the locally storable information comprises one or more selected from the list consisting of: (i) address translation information; (ii) branch prediction information and (iii) information held by a cache memory.
6. The apparatus of clause 4 or clause 5, in which the predetermined stage of execution at a processing element comprises initiating handling of the control function by circuitry controlling storage of locally storable information at that processing element.
7. The apparatus of any one of clauses 4 to 6, in which the predetermined stage of execution at a processing element comprises completion of the control function by circuitry controlling storage of locally storable information at that processing element.
8. The apparatus of clause 1, in which:
    the group of processing elements comprises all of the plurality of processing elements.
9. The apparatus of clause 8, in which the control circuitry is configured to issue a respective command defining the hybrid operation to each of the group of processing elements sequentially.
10. The apparatus of clause 8 or clause 9, in which the plurality of processing elements and the control circuitry are configured as a network of circuitries, and the data communication path comprises a set of interconnections between the plurality of processing elements and the control circuitry.
11. The apparatus of clause 3, in which:
    the group of processing elements comprises all of the plurality of processing elements other than the given processing element.
12. The apparatus of clause 10, in which the control circuitry is configured to issue a respective command defining the hybrid operation sequentially to each of the plurality of processing elements other than the given processing element.

13. The apparatus of clause 2 or any one of clauses 3 to 7 which depend on clause 2, in which the given processing element is configured to request an operation by the control circuitry by executing an instruction selected from an instruction set comprising one or more instructions to request initiation of respective control functions without initiating a synchronization event, one or more instructions to request initiation of a synchronization event, and one or more instructions to request initiation of hybrid operations.

14. The apparatus of clause 2 or any one of clauses 3 to 7 which depend on clause 2, in which the given processing element is configured to request an operation by the control circuitry by executing an instruction selected from an instruction set comprising one or more instructions to request initiation of respective control functions without initiating a synchronization event and one or more instructions to request initiation of a synchronization event.

15. The apparatus of clause 14, in which the given processing element comprises an instruction decoder configured, in response to the instruction decoder decoding an instruction to request initiation of respective control functions without initiating a synchronization event; and decoding an instruction to request initiation of a synchronization event, to generate one or more micro-operations which, when executed, are configured to control generation a request for initiating the hybrid operation.

16. The apparatus of clause 15, comprising instruction fetch circuitry to fetch groups of instructions for decoding at a same decoding cycle of the instruction decoder; in which the instruction decoder is configured to generate the one or more micro-operations which, when executed, are configured to control generation of a request for initiating the hybrid operation when the decoded instruction to request initiation of respective control functions without initiating a synchronization event and the decoded instruction to request initiation of a synchronization event are in a same group of instructions fetched by the instruction fetch circuitry.

17. The apparatus of clause 14, in which the given processing element is configured to merge a result of execution by the given processing element of an instruction to request initiation of respective control functions without initiating a synchronization event and a result of execution by the given processing element of an instruction to request initiation of a synchronization event, to generate a request for initiating the hybrid operation.

18. The apparatus of clause 17, in which the given processing element is configured to generate the request for initiating the hybrid operation when the result of execution by the given processing element of an instruction to request initiation of respective control functions without initiating a synchronization event and a result of execution by the given processing element of an instruction to request initiation of a synchronization event are generated within a threshold number of clock cycles of one another.

19. A method comprising:
communicating, by a control circuitry, with a plurality of processing elements by a data communication path;
in response to a request by a given processing element of the plurality of processing elements, initiating a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution; and
the given processing element inhibiting the issue of any further control function requests until each of the group of processing elements has provided such confirmation.

20. The method of clause 19, comprising:
the control circuitry selectively performing as separate respective operations:
in response to a control function request issued by the given processing element, issuing a command to initiate performance of the control function at each of the set of processing elements; and
in response to a synchronization request issued by the given processing element, initiating the synchronization event.

The invention claimed is:

1. Apparatus comprising:
a plurality of processing elements; and
control circuitry configured to communicate with the plurality of processing elements by a data communication path;
the control circuitry being configured, in response to a request issued by a given processing element of the plurality of processing elements, to initiate a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution,
in which the given processing element is configured to inhibit the issuance of any further requests to the control circuitry until each of the group of processing elements has provided such confirmation,
wherein the control circuitry is further configured to selectively perform as separate respective operations:
in response to a control function request issued by the given processing element, issuing a command to perform the control function; and
in response to a synchronization request issued by the given processing element, issuing a command to initiate the synchronization event,
wherein the control circuitry is configured to selectively perform the separate respective operations or initiate the hybrid operation depending on at least one of:

the control function request and the synchronization request being issued in a same group of requests, or the control function request and the synchronization request being issued within a predetermined period of each other.

2. The apparatus of claim 1, in which the given processing element is configured to initiate performance of the hybrid operation by the given processing element.

3. The apparatus of claim 1, in which:
each of the processing elements is configured to store locally storable information; and
each of the processing elements is configured, in response to initiation of a control function defining an item of locally storable information, to invalidate any copy of that item of locally storable information held at that processing element.

4. The apparatus of claim 3, in which the locally storable information comprises one or more selected from the list consisting of: (i) address translation information; (ii) branch prediction information and (iii) information held by a cache memory.

5. The apparatus of claim 3, in which the predetermined stage of execution at a processing element comprises initiating handling of the control function by circuitry controlling storage of locally storable information at that processing element.

6. The apparatus of claim 3, in which the predetermined stage of execution at a processing element comprises completion of the control function by circuitry controlling storage of locally storable information at that processing element.

7. The apparatus of claim 1, in which:
the group of processing elements comprises all of the plurality of processing elements.

8. The apparatus of claim 7, in which the control circuitry is configured to issue a respective command defining the hybrid operation to each of the plurality of processing elements sequentially.

9. The apparatus of claim 7, in which the plurality of processing elements and the control circuitry are configured as a network of circuitries, and the data communication path comprises a set of interconnections between the plurality of processing elements and the control circuitry.

10. The apparatus of claim 2, in which:
the group of processing elements comprises all of the plurality of processing elements other than the given processing element.

11. The apparatus of claim 9, in which the control circuitry is configured to issue a respective command defining the hybrid operation sequentially to each of the group of processing elements.

12. The apparatus of claim 1, in which the given processing element is configured to request an operation by the control circuitry by executing an instruction selected from an instruction set comprising one or more instructions to request initiation of respective control functions without initiating a synchronization event, one or more instructions to request initiation of a synchronization event, and one or more instructions to request initiation of hybrid operations.

13. The apparatus of claim 1, in which the given processing element is configured to request an operation by the control circuitry by executing an instruction selected from an instruction set comprising one or more instructions to request initiation of respective control functions without initiating a synchronization event and one or more instructions to request initiation of a synchronization event.

14. The apparatus of claim 13, in which the given processing element comprises an instruction decoder configured, in response to the instruction decoder decoding an instruction to request initiation of respective control functions without initiating a synchronization event; and decoding an instruction to request initiation of a synchronization event, to generate one or more micro-operations which, when executed, are configured to control generation a request for initiating the hybrid operation.

15. The apparatus of claim 14, comprising instruction fetch circuitry to fetch groups of instructions for decoding at a same decoding cycle of the instruction decoder;
in which the instruction decoder is configured to generate the one or more micro-operations which, when executed, are configured to control generation a request for initiating the hybrid operation when the decoded instruction to request initiation of respective control functions without initiating a synchronization event and the decoded instruction to request initiation of a synchronization event are in a same group of instructions fetched by the instruction fetch circuitry.

16. The apparatus of claim 13, in which the given processing element is configured to merge a result of execution by the given processing element of an instruction to request initiation of respective control functions without initiating a synchronization event and a result of execution by the given processing element of an instruction to request initiation of a synchronization event, to generate a request for initiating the hybrid operation.

17. The apparatus of claim 16, in which the given processing element is configured to generate the request for initiating the hybrid operation when the result of execution by the given processing element of an instruction to request initiation of respective control functions without initiating a synchronization event and a result of execution by the given processing element of an instruction to request initiation of a synchronization event are generated within a threshold number of clock cycles of one another.

18. A method comprising:
communicating, by a control circuitry, with a plurality of processing elements by a data communication path;
in response to a request by a given processing element of the plurality of processing elements, initiating a hybrid operation by issuing a command defining the hybrid operation to a group of processing elements comprising at least a subset of the plurality of processing elements, the hybrid operation comprising performance of a control function selected from a predetermined set of one or more control functions and initiation of performance of a synchronization event, the synchronization event comprising each of the group of processing elements providing confirmation that any control functions pending at that processing element have reached at least a predetermined stage of execution; and
the given processing element inhibiting the issue of any further control function requests until each of the group of processing elements has provided such confirmation,
the control circuitry selectively performing as separate respective operations:
in response to a control function request issued by the given processing element, issuing a command to initiate performance of the control function at each of the set of processing elements;
in response to a synchronization request issued by the given processing element, initiating the synchronization event;

the control circuitry selectively performing the separate respective operation or initiating the hybrid operation depending on at least one of:
  the control function request and the synchronization request being issued in a same group of requests, or
  the control function request and the synchronization request being issued within a predetermined period of each other.

* * * * *